(12) United States Patent
Tyler et al.

(10) Patent No.: US 7,617,609 B2
(45) Date of Patent: Nov. 17, 2009

(54) COURSING TOOL CALCULATOR

(75) Inventors: Francis S. Tyler, Westerville, OH (US);
Joshua M Broehl, Worthington, OH (US); James H Lua, Columbus, OH (US)

(73) Assignee: Owens Corning Intellectual Capital, LLC, DE (US)

( * ) Notice: Subject to any disclaimer, the term of this patent is extended or adjusted under 35 U.S.C. 154(b) by 32 days.

(21) Appl. No.: 12/062,554

(22) Filed: Apr. 4, 2008

(65) Prior Publication Data

US 2009/0249632 A1    Oct. 8, 2009

(51) Int. Cl.
*G06G 1/02*    (2006.01)
*G01B 5/14*    (2006.01)

(52) U.S. Cl. .............................. 33/1 SB; 33/526; 33/810

(58) Field of Classification Search .................... 33/1 G, 33/1 BB, 1 SB, 1 SD, 494, 526, 679.1, 810
See application file for complete search history.

(56) References Cited

U.S. PATENT DOCUMENTS

| | | | | |
|---|---|---|---|---|
| 1,305,562 A | * | 6/1919 | Paulson | 33/679.1 |
| 3,751,814 A | * | 8/1973 | Crawford | 33/810 |
| 4,730,399 A | * | 3/1988 | Campbell | 33/810 |
| 5,022,162 A | * | 6/1991 | Luikko | 33/810 |
| 5,412,878 A | * | 5/1995 | Edman | 33/810 |
| 5,555,628 A | * | 9/1996 | Madden | 33/1 SB |
| 6,895,683 B1 | * | 5/2005 | Olsen | 33/1 G |
| 7,513,058 B2 | * | 4/2009 | Cahalane | 33/494 |
| 2004/0261277 A1 | * | 12/2004 | Hughes | 33/1 SB |
| 2007/0294904 A1 | * | 12/2007 | Jacobs | 33/679.1 |

* cited by examiner

*Primary Examiner*—G. Bradley Bennett
(74) *Attorney, Agent, or Firm*—James J. Dottavio; Joan N. Drew

(57) ABSTRACT

A tool is provided for calculating the length and number of filler design elements to be used to eliminate an irregular gap in a wall being covered with cast veneer wall panels having a series of repeating design elements. The tool includes a ruler having gap measurement, length of cut and number of filler design element scales. The tool also includes a medial slide carried on the ruler. Two measuring points are also provided. The first is carried on the ruler. The second is carried on the medial slide.

10 Claims, 6 Drawing Sheets

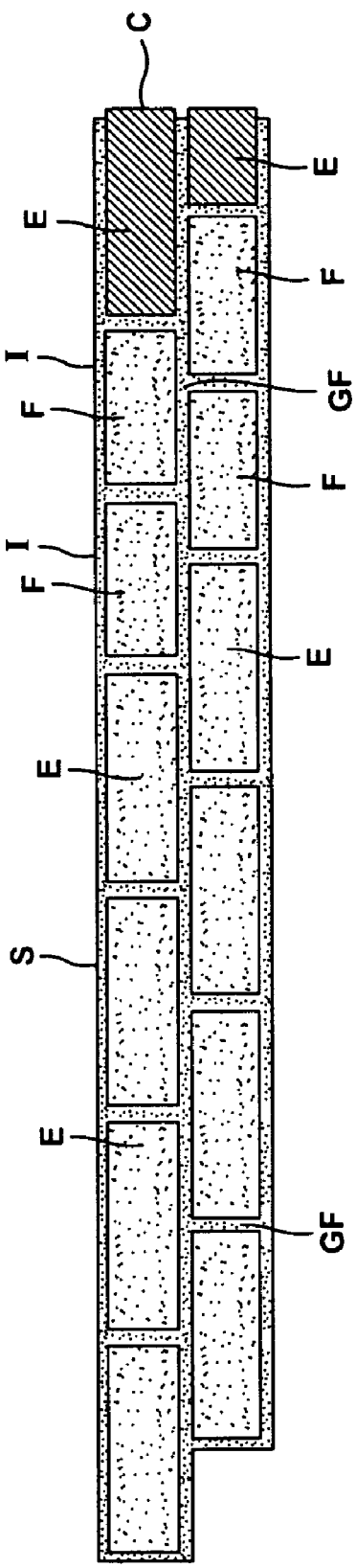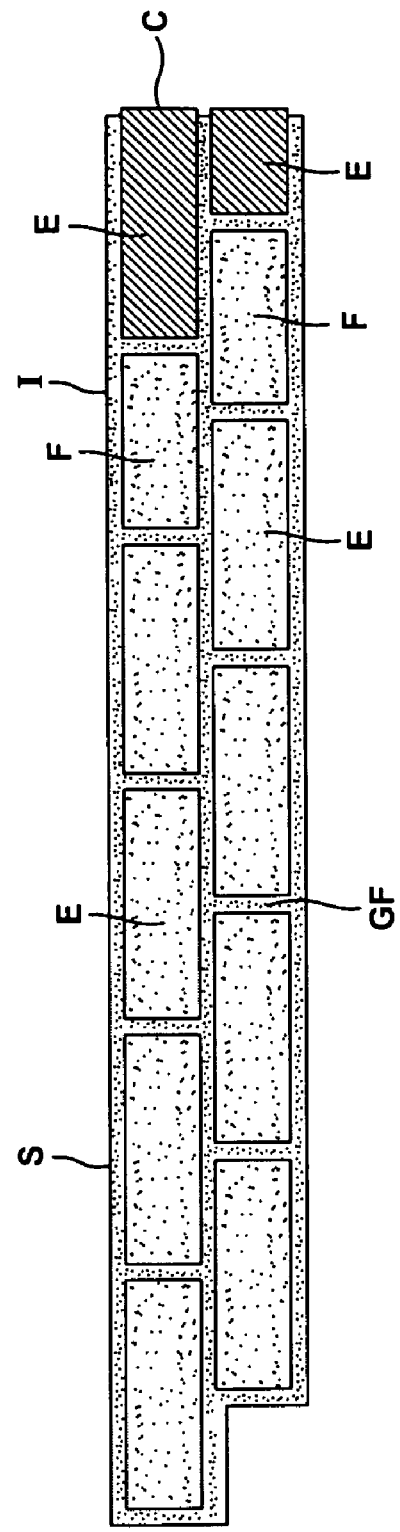

COURSING TOOL CALCULATOR

TECHNICAL FIELD AND INDUSTRIAL APPLICABILITY OF THE INVENTION

The present invention relates generally to the construction field and, more particularly, to a coarsing tool calculator for constructing a wall façade from precast veneer wall panels incorporating a series of repeating design elements.

BACKGROUND OF THE INVENTION

Prefabricated or cast veneer wall panels have been developed as a quick and efficient way to provide a masonry appearance for a building while simplifying construction and lowering construction cost. The design elements of prefabricated wall panels typically simulate brick, stone, tile and other masonry building components or materials commonly used in the construction of buildings. Examples of prefabricated wall panels are disclosed in, for example, U.S. Pat. Nos. 1,592,591 to Amele; 4,659,055 to Hardt; 3,426,490 to Taylor; 4,644,719 to Salazar; and 3,740,910 to Taylor et al.

Often, the length of a prefabricated wall panel and the distance to a particular end point such as the corner of a building do not match. When this occurs an irregular gap G (see FIGS. 3A-3D) is provided between the design elements E of the panels S, C. Typically, this gap G is filled with grout so that a wide band of grout is provided between the design elements E. The irregular gap G filled with grout interrupts the repeating pattern of the design elements E and adversely affects the aesthetic appearance of the finished wall.

The present invention relates to a coursing tool calculator used to determine the required cut length of filler design elements needed to eliminate the irregular gaps G and produce a wall having an enhanced aesthetic appearance.

SUMMARY OF THE INVENTION

In accordance with the purposes of the present invention as described herein, a coursing tool is provided for calculating the length of filler design elements to be used to fill an irregular, unclad gap in a wall being covered with precast veneer wall panels. The tool may be generally described as comprising (a) a ruler including a gap measurement scale and a length of cut scale and (b) a medial slide carried on the ruler. In addition, the tool may include a number of filler design elements scale. Typically, the gap measurement scale runs from about 0 to about 8 inches, while the length of cut scale runs from about 4 to about 8 inches. The number of design elements scale includes 1 or 2 design elements.

The slide includes a first window for viewing the gap measurement scale, a second window for viewing the number of design elements scale, and a third window for viewing the length of cut scale. The tool further includes a first measuring point on the ruler and a second measuring point on the slide. These measuring points may be used to measure the width of the gap.

In accordance with yet another aspect of the present invention, a method is provided for filling an irregular gap between design elements in a wall being covered with cast veneer wall panels having a series of repeating design elements. The method includes the steps of (a) using a tool including a ruler and medial slide to measure the width of the irregular gap, (b) reading scales provided on the tool to determine the length and number of filler design elements to be utilized to fill the irregular gap, and (c) placing the length and number of filler design elements indicated by the scales in the irregular gap to fill the gap.

In the following description there is shown and described several different embodiments of the invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated herein and forming a part of the specification, illustrate several aspects of the present invention and together with the description serve to explain certain principles of the invention. In the drawings:

FIGS. 4A-4D are front elevational views illustrating how the insert panel is used to fill and eliminate the irregular gaps in the walls illustrated in corresponding FIGS. 3A-3D.

Reference will now be made in detail to the various embodiments of the present invention, examples of which are illustrated in the accompanying drawings.

DETAILED DESCRIPTION OF THE PREFERRED EMBODIMENTS OF THE INVENTION

Figure 1:
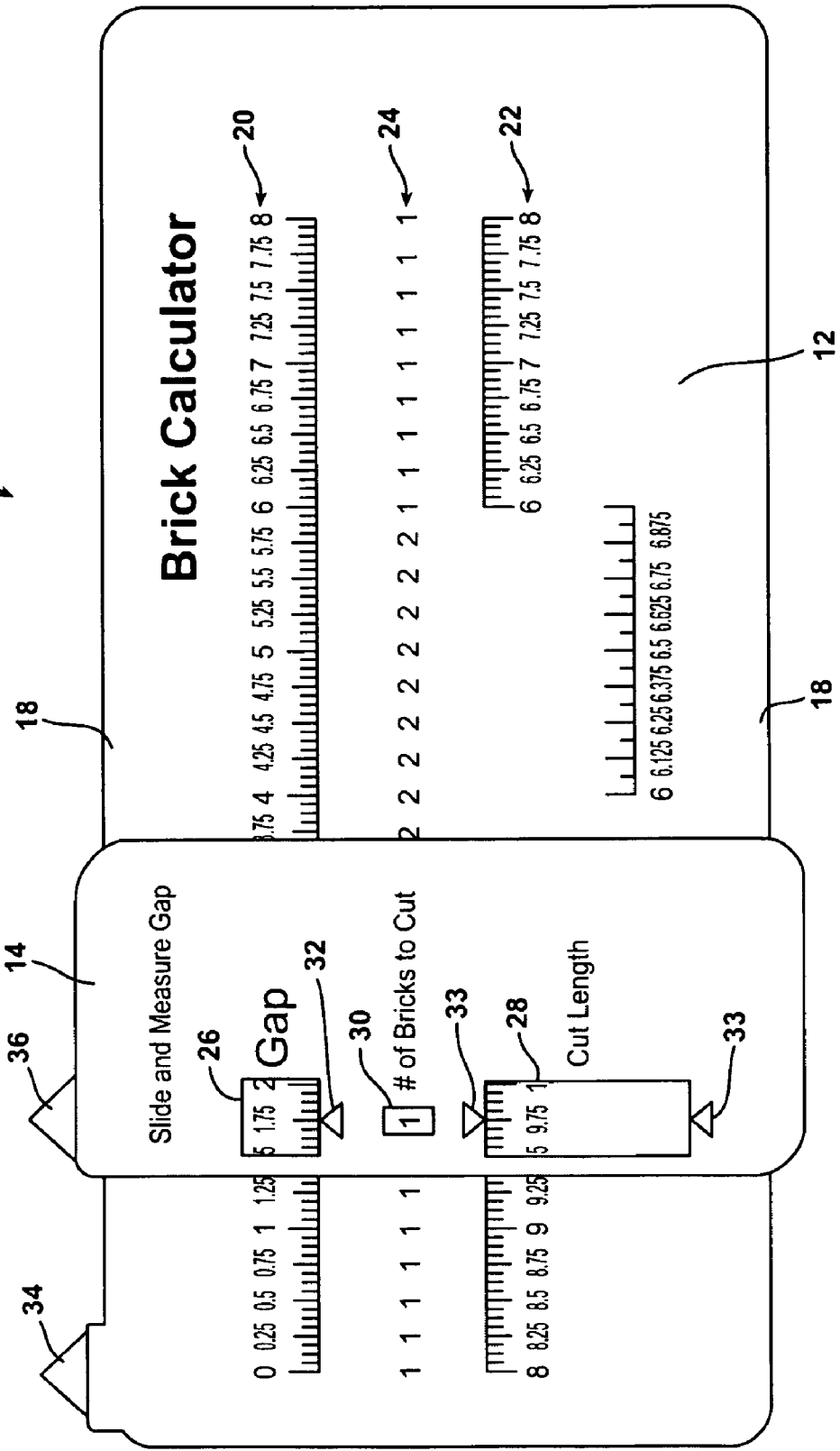
FIG. 1 is a front plan view of the coarsing tool of the present invention.
Figure 2:
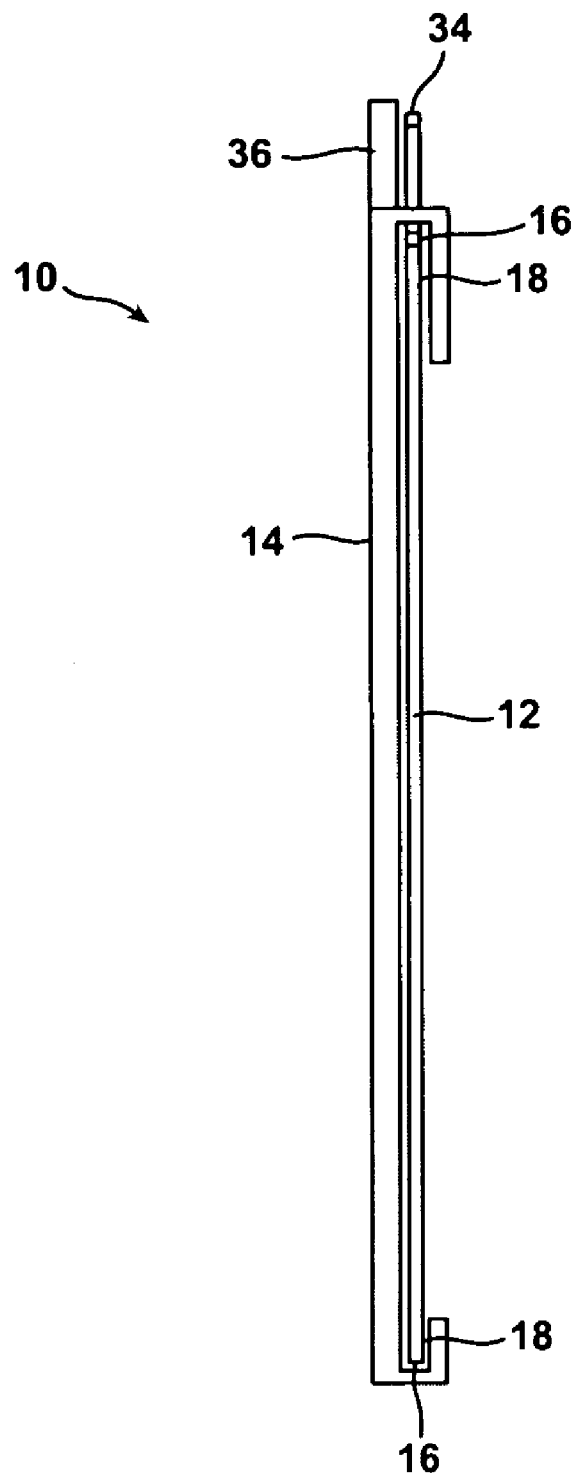
FIG. 2 is an end elevational view showing how the medial slide is received on the ruler to allow free sliding movement with respect to the ruler.

Reference is now made to FIGS. 1 and 2 illustrating the coursing tool 10 of the present invention. The tool is useful in a precast veneer wall panel system incorporating standard wall panels S (see FIGS. 3-4) and insert wall panels I (see FIG. 4) that are used together to construct a substantially continuous and uninterrupted façade of design elements E, F (see FIGS. 3-4) without any irregular gaps G (see FIGS. 3-4) between design elements.

Figure 3A:
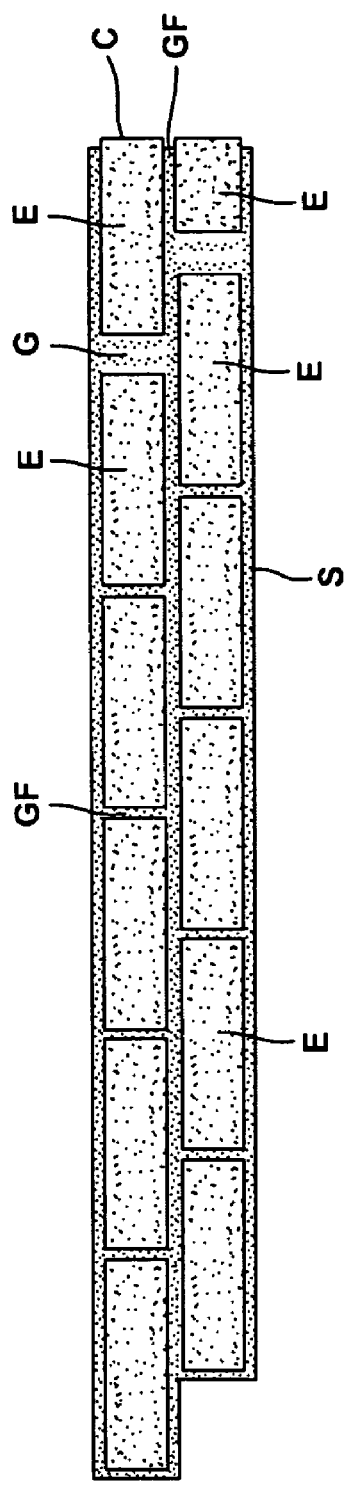
FIGS. 3A-3D are front elevational views illustrating the irregular gap left between a straight panel and a corner panel at an outside corner of a building.
Figure 3B:
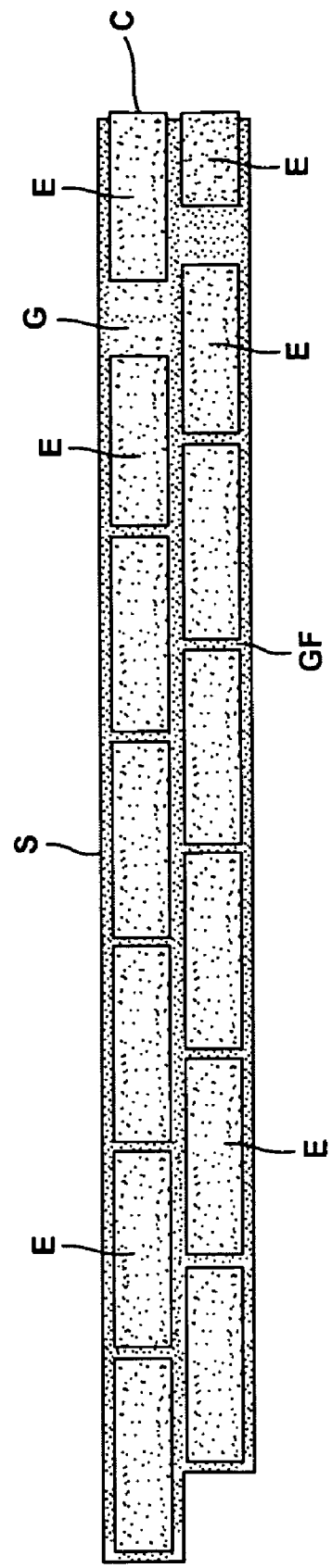
Figure 3C:
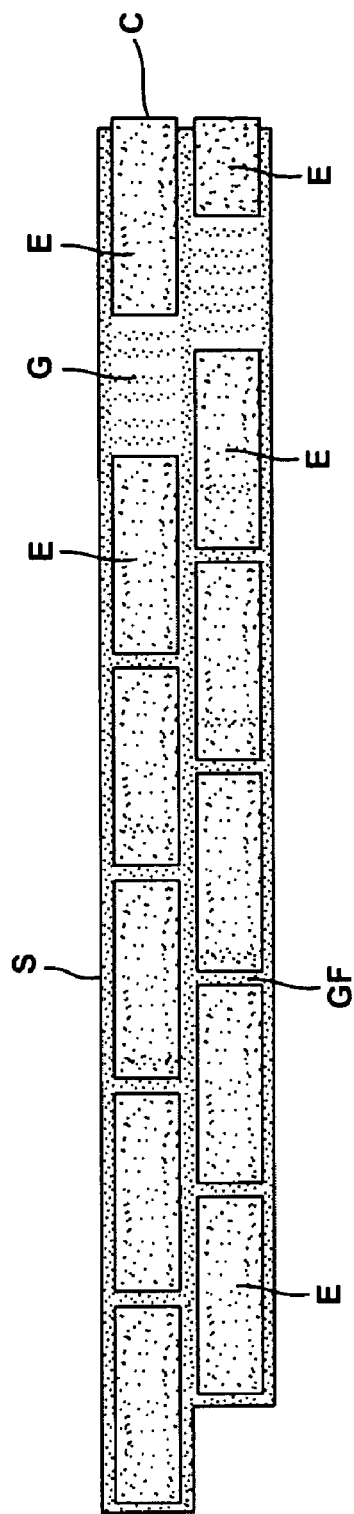
Figure 3D:
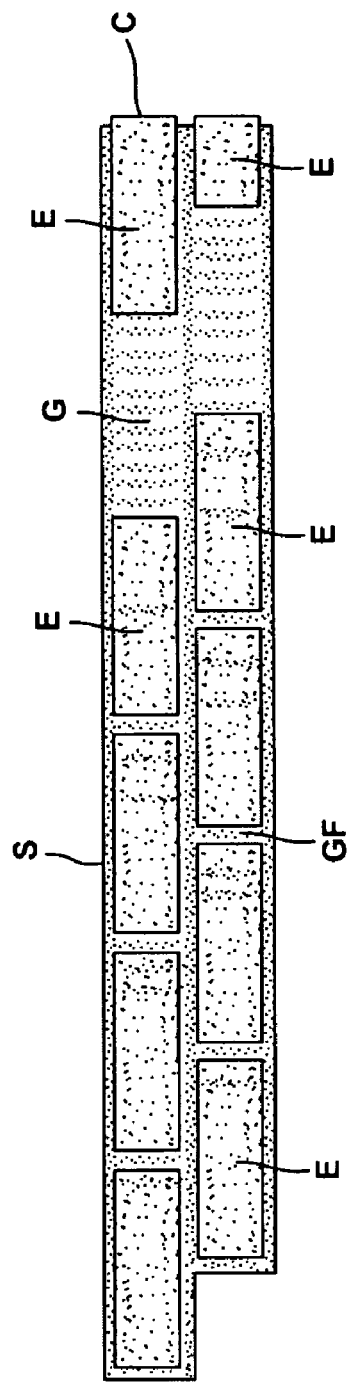
Figure 4A:
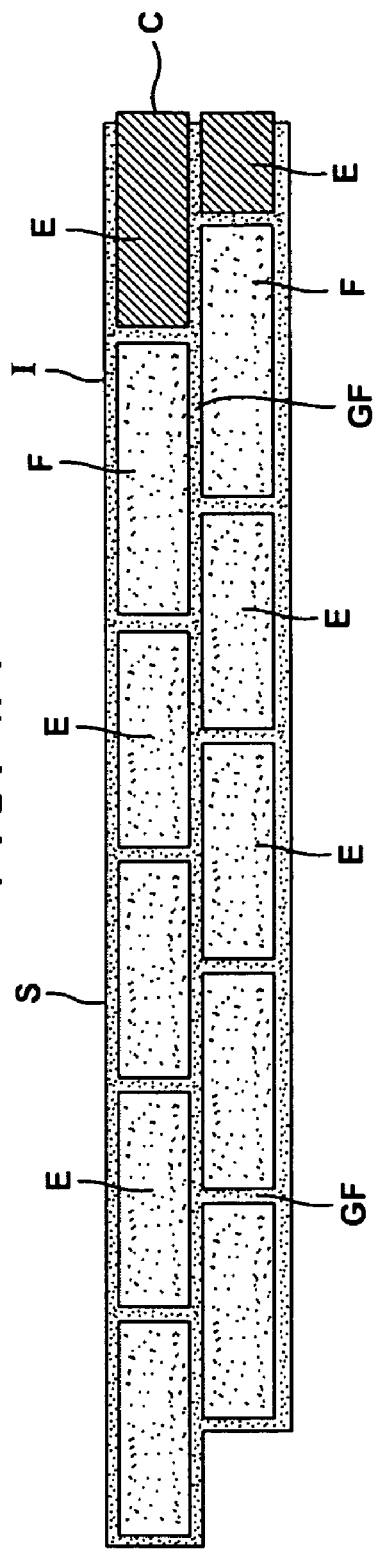
Figure 4B:
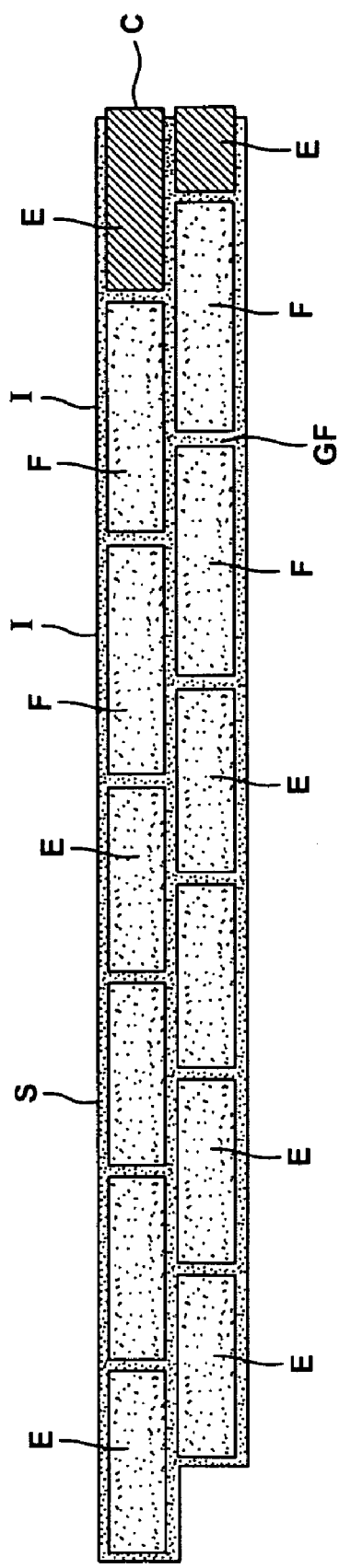

For purposes of this document, the terminology "standard panel" is to be given the broadest possible interpretation and covers any type of panel in the system that is not an insert panel I. Thus, a standard panel S, C can include straight wall panels, corner panels, window surround panels, door surround panels, and the like. Straight wall panels S and corner panels C are illustrated in FIGS. 3A-3D and 4A-4D. Insert panels I, one filler design element F in width, are also illustrated in FIGS. 4A-4D. The standard panels S, C may be generally described as comprising a precast body including at least one decorative design element E. As illustrated in FIGS. 3A and 3C there are five overlapping brick design elements in two rows. In FIG. 3B there are six brick design elements E in each of the two rows. In FIG. 3D there are four brick design elements E in each of the two rows. It should be appreciated that substantially any other masonry material known in the art may be simulated including bricks of different sized, stones of the same or different sizes or shapes, tiles of different sizes and shapes, and the like. The standard panel S, C also includes a grout field GF for receiving and holding grout that outlines the design elements E to provide the desired masonry appearance. The insert panel I may be generally described as comprising a precast body that is one filler design element F in width. The insert panel I illustrated in FIGS. 4A-4D are all two rows of filler design elements F in height. Like the standard panels S, C, the insert panel I also includes a grout field GF for holding grout that outlines the filler design elements F to provide the desired masonry appearance.

The standard panels S, C and insert panels I are typically made from a cast material such as concrete, reinforced concrete, gypsum, reinforced cementitious material and mixtures thereof. Typically the cast material reinforcement comprises fiber selected from a group of materials consisting of glass fibers, mineral fibers, natural fibers, polymer fibers and mixtures thereof. Where glass fibers are used they are typically of the E-glass or AR-glass type, which exhibits some alkali resistance. The standard panel S, C is typically mounted to the wall sheathing or framework of a building by fasteners, such as nails in a manner well known in the art.

The tool 10 generally comprises a ruler 12 and a medial slide 14. The medial slide 14 includes two opposing channels 16 spaced from each other and shaped to engage the opposing margins 18 of the ruler 12 (see particularly FIG. 2). As a consequence of this design, the user may slide or shift the medial slide 14 along the ruler 12 to measure the irregular gap G between design elements E, which it is desired to fill in a manner described in greater detail below.

As further illustrated in FIG. 1, the ruler includes a gap measurement scale 20. Where the design elements E of the standard panels S, C have an overall length $L_1$, the gap measurement scale 20 also has an overall length $L_1$. Thus, where the design element E has a length of 8 inches, the gap measurement scale 20 also has a length of 8 inches.

The ruler 12 also includes a length of cut scale 22. The length of cut scale 22 typically runs from a length of $L_1/2$ to $L_1$ or, in the current embodiment, from 4 to 8 inches. The ruler 12 also includes a number of filler design elements scale 24. As will be described in greater detail below, depending on the width of the irregular gap G to be filled, it may be necessary to cut 1 or 2 filler design elements to the length indicated on the length of cut scale 22.

As further illustrated in FIG. 1, the slide 14 includes a first window 26 for viewing the gap measurement scale 20, a second window 28 for viewing the length of cut scale 22 and a third window 30 for viewing the number of filler design elements scale 24. An indicator arrow 32 adjacent the first window 26 and indicator arrows 33 adjacent the third window 30 ensure that the proper gap measurement and length of cut are read from the respective scales 20, 22. As further illustrated, a first measuring point 34 is provided on the ruler 12. Additionally, a second measuring point 36 is provided on the slide 14. As will be apparent, the slide 14 may be moved anywhere along the ruler 12 over the full length of the gap measurement scale 20.

The use of the tool 10 will now be discussed in detail with reference to drawing FIGS. 3A-3D and 4A-4D. Initially the user positions the straight panel S and corner panel C on the wall being constructed and then uses the tool 10 to measure the irregular, unclad gap G provided between the design elements E provided at the ends of the two panels S, C. This measurement is done by positioning the first measuring point 34 on the ruler 12 at a first side of the gap G, holding the longitudinal axis of the ruler 12 in alignment with the longitudinal axis of the aligned elements E and then sliding the medial slide 14 along the ruler 12 until the second measuring point 36 is aligned with the second or opposite side of the gap G. The width of the gap G is then indicated on the gap measurement scale 20 in the first window 28 of the slide 14 just above the indicator arrow 32.

The operator then views a number from the number of design elements scale 24 through the second window 28 of the slide 14. This number indicates the number of insert panels I (with filler design elements F to be cut to a particular length) that are needed in order to fill the gap G.

The length to which the filler design elements F of the insert panels I are to be cut is found in the third window 30 of the slide 14. More specifically, the operator looks at the length indicated on the length of cut scale 22 between the indicator arrows 33 at the top and bottom of the third window 30.

The user then uses an appropriate tool such as a saw to cut the filler design elements F on the number of insert panels I indicated in the second window 28 to the size indicated in the third window 30. The cut insert panels I are then positioned to fill the gap G between the straight panel S and the corner panel C so that the design elements E, F are provided in a consistent and continuous façade and irregular gaps G between design elements are eliminated.

As illustrated in FIG. 3A, the straight standard panel S includes two rows, each row incorporating five aligned design elements 12. For purposes of this description and the illustrations presented in FIGS. 3A-3D and 4A-4D, each design element E on the standard panels S, C has a length $L_1$ of eight inches. In contrast, each filler design element F on each insert panel I has a length $L_2$ of 10 inches.

As illustrated in FIG. 3A, an irregular gap G of one inch in width is formed between the adjacent and aligned end design elements E of the standard straight and corner panels S, C. The tool 10 is used to measure the gap G in the manner described above. As illustrated in FIG. 4A, an irregular gap G of between 0 to 2 inches may be filled and eliminated by replacing the end design elements E on the straight panels S with an insert panel I having filler design elements F cut to a length $L_3$ necessary to fill the gap G. Thus, if the gap is 1 inch in width, the filler design elements F are cut to a length $L_3$ of 9 inches (indicated in window 28), that is, 1 inch more than the length $L_1$ of the standard design elements E. As illustrated in FIG. 4A, the longer filler design elements F blend in nicely with the standard length design elements E of the standard panel S, C to create a more aesthetically pleasing and continuous façade.

As illustrated in FIG. 3B, coursing completed with the standard panels S, C leaves an irregular gap G of 3 inches in width between the end design elements E on the standard straight panel S and the design elements E of the standard corner panel C.

This gap G is measured with the tool 10 as described above. As indicated by the tool 10 and illustrated in FIG. 4B, this irregular gap G may be filled by replacing the last two design elements E on the straight panel S closest to the corner panel C with two insert panels I wherein the filler design elements F of the insert panels I have been cut to a length $L_3$ of 9.5 inches each. Thus, each of the two filler design elements F and the two insert panels I is 1.5 inches longer than the design elements E of the standard panels S, C. Accordingly, the 3 inch wide irregular gap G is filled and the slightly longer filler design elements F are hardly noticeable in the façade. Accordingly, a more continuous and aesthetically pleasing wall is constructed.

As indicated by measuring with the tool 10 and illustrated in FIG. 3C, the coursing of the standard panels 10 leaves a 5 inch wide irregular gap G between the end design elements E of the standard straight panel S and the design elements E of the standard corner panels C. In order to fill the irregular gap G, the end design elements E of the straight panels are replaced with two insert panels I wherein the filler design elements F have been cut to a length of 6.5 inches each (see FIG. 4C). This serves to fill the irregular gap G and once again provide a continuous, aesthetically pleasing façade all the way to the corner of the building.

Finally, FIG. 3D illustrates the situation wherein an irregular gap G of 7 inches in width is provided between the end design elements E of the standard straight panel S and the design elements E of the standard corner panel C. In this situation, the tool 10 indicates that a single insert panel I with filler design elements F cut to a length of 7 inches is inserted between the straight panel S and the corner panel C in order to fill the irregular gap G. As illustrated in FIG. 4D, this arrangement functions to provide a continuous and aesthetically pleasing façade all the way to the corner of the building.

As clearly illustrated in FIGS. 3A-3D and 4A-4D, the invention also embodies a method for filling an irregular gap between design elements as a wall being covered with cast veneer wall panels having a series of repeating design elements. That method may be broadly described as including the steps of: (a) using a tool including a ruler and medial slide to measure the width of the irregular gap, (b) reading scales provided on the tool to determine the length and number of filler design elements to be utilized to fill the irregular gap, and (c) placing the length and number of filler design elements indicated by the scales in the irregular gap to fill the gap.

The foregoing description of the preferred embodiments of the present invention have been presented for purposes of illustration and description. It is not intended to be exhaustive or to limit the invention to the precise form disclosed. Obvious modifications or variations are possible in light of the above teachings. For example, the slide 14 could include a single window for viewing all three scales 20, 22, 24 instead of three separate windows 26, 28, 30. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims in their fair and broad interpretation in any way.

What is claimed:

1. A tool for calculating the length of filler design elements to be used to fill an irregular gap in a wall being covered with precast veneer wall panels, comprising:
   a ruler including a gap measurement scale and a length of cut scale; and
   a medial slide carried on said ruler.

2. The tool of claim 1, further including a number of design elements scale.

3. The tool of claim 1, wherein said gap measurement scale runs from about 0 to about 8 inches.

4. The tool of claim 1, wherein said length of cut scale runs from about 4 to about 8 inches.

5. The tool of claim 2, wherein said number of design elements scale includes 1 and 2.

6. The tool of claim 1, wherein said slide includes a window for viewing said gap measurement and length of cut scales.

7. The tool of claim 2, wherein said slide includes a first window for viewing said gap measurement scale, a second window for viewing said length of cut scale and a third window for viewing said number of design elements scale.

8. The tool of claim 7, wherein said tool includes a first measuring point on said ruler and a second measuring point on said slide.

9. The tool of claim 1, wherein said tool includes a first measuring point on said ruler and a second measuring point on said slide.

10. A method for filling an irregular gap between design elements in a wall being covered with cast veneer wall panels having a series of repeating design elements, said method comprising:
    using a tool including a ruler and medial slide to measure width of said irregular gap,
    reading scales provided on said tool to determine the length and number of filler design elements to be utilized to fill said irregular gap, and
    placing said length and number of filler design elements indicated by said scales in said irregular gap to fill said gap.

* * * * *